(12) United States Patent
Shaw

(10) Patent No.: US 11,135,757 B2
(45) Date of Patent: Oct. 5, 2021

(54) EXTRUSION SYSTEM AND METHOD FOR BLOWN FILM

(71) Applicant: Inteplast Group Corporation, Livingston, NJ (US)

(72) Inventor: Todd Shaw, Richmond, RI (US)

(73) Assignee: INTEPLAST GROUP CORPORATION, Livingston, NJ (US)

( * ) Notice: Subject to any disclaimer, the term of this patent is extended or adjusted under 35 U.S.C. 154(b) by 134 days.

(21) Appl. No.: 16/695,323

(22) Filed: Nov. 26, 2019

(65) Prior Publication Data

US 2020/0171729 A1     Jun. 4, 2020

Related U.S. Application Data

(60) Provisional application No. 62/773,439, filed on Nov. 30, 2018.

(51) Int. Cl.
*B29C 48/88* (2019.01)
*B29C 48/00* (2019.01)
*B29C 48/10* (2019.01)
*B29L 23/00* (2006.01)
*B29K 23/00* (2006.01)
*B29C 48/32* (2019.01)

(52) U.S. Cl.
CPC ........ *B29C 48/912* (2019.02); *B29C 48/0018* (2019.02); *B29C 48/10* (2019.02); *B29C 48/913* (2019.02); *B29C 48/32* (2019.02); *B29K 2023/065* (2013.01); *B29K 2023/0625* (2013.01); *B29K 2023/0633* (2013.01); *B29L 2023/001* (2013.01)

(58) Field of Classification Search
CPC . B29C 48/0017; B29C 48/0018; B29C 48/10; B29C 48/147; B29C 48/1472; B29C 48/1474; B29C 48/32–34; B29C 48/88–919; B29C 48/912; B29C 48/0019; B29C 48/12; B29C 48/913; B29L 2023/001; B29K 2023/0633; B29K 2023/065; B29K 2023/0625
See application file for complete search history.

(56) References Cited

U.S. PATENT DOCUMENTS

| | | | |
|---|---|---|---|
| 4,091,059 A | | 5/1978 | Ryder |
| 4,115,047 A | * | 9/1978 | Stelmack ............... B29C 48/10 |
| | | | 425/72.1 |
| 4,139,338 A | | 2/1979 | Cole |

(Continued)

FOREIGN PATENT DOCUMENTS

GB        2286557    *  8/1995

*Primary Examiner* — Jeffrey M Wollschlager
(74) *Attorney, Agent, or Firm* — Stinson LLP

(57) ABSTRACT

A method for manufacturing a blown plastic film using an extruder, the method comprising extruding a tube of polymer resin; cooling air from a temperature of greater than 55° F. down to a temperature between about 35° F. about 50° F., to produce an intermediate cooled air stream; dehumidifying the intermediate cooled air stream to less than about 15% humidity, to produce a dehumidified intermediate cooled air stream; cooling the dehumidified intermediate cooled air stream to less than 35° F., to produce a super-cooled air stream; and directing the super-cooled air stream at the extruded tube of polymer resin.

14 Claims, 3 Drawing Sheets

(56) References Cited

U.S. PATENT DOCUMENTS

| | | | | |
|---|---|---|---|---|
| 4,176,155 | A | * | 11/1979 | Heisterkamp ........... B29C 48/10 264/564 |
| 4,259,047 | A | | 3/1981 | Cole |
| 4,315,963 | A | * | 2/1982 | Havens ................... B29C 48/10 428/35.2 |
| 4,728,277 | A | * | 3/1988 | Planeta ................... B29C 48/10 425/72.1 |
| 5,126,096 | A | | 6/1992 | Grady |
| 5,213,725 | A | * | 5/1993 | Lee ..................... B29C 48/9125 264/37.16 |
| 5,225,139 | A | * | 7/1993 | Wajsbrot ................ B29C 55/28 264/514 |
| 5,310,329 | A | | 5/1994 | Cree |
| 6,273,699 | B1 | * | 8/2001 | Finke ..................... B29C 48/92 425/72.1 |
| 6,293,778 | B1 | | 9/2001 | Joseph |
| 6,389,828 | B1 | * | 5/2002 | Thomas ................... F25D 3/11 62/186 |
| 6,637,213 | B2 | * | 10/2003 | Hutchison ............... B29C 48/21 62/63 |
| 7,736,140 | B2 | * | 6/2010 | Hennes ................. B29C 48/913 425/72.1 |
| 9,193,107 | B2 | | 11/2015 | Bertrand |
| 9,611,338 | B2 | | 4/2017 | Pellegatti et al. |
| 9,815,238 | B2 | | 11/2017 | Kosub et al. |
| 2004/0032039 | A1 | * | 2/2004 | Krycki ................... B29C 48/92 264/40.1 |
| 2004/0242732 | A1 | * | 12/2004 | Yu ........................... C08L 31/04 524/50 |
| 2008/0116604 | A1 | * | 5/2008 | Thomas ................ B29C 48/903 264/237 |
| 2015/0375438 | A1 | | 12/2015 | Kosub et al. |
| 2018/0370109 | A1 | | 12/2018 | Shaw |

* cited by examiner

EXTRUSION SYSTEM AND METHOD FOR BLOWN FILM

REFERENCE TO RELATED APPLICATION

This application claims priority to U.S. provisional application 62/773,439 filed Nov. 30, 2018, the entire disclosure of which is incorporated herein by reference.

FIELD OF THE INVENTION

The present invention generally relates to blown films for bags and packaging.

BACKGROUND

Plastic films are typically manufactured by a method and system generally known as blown film extrusion. Systems such as internal bubble cooling as disclosed in U.S. Pat. No. 9,815,238 and equipment such as air rings as disclosed in U.S. Pat. No. 4,259,047 are commonly used to improve the quality of the film and to increase the cooling of the film to allow for faster line speeds.

SUMMARY

Briefly, therefore, the invention is directed to a method for manufacturing a blown plastic film using an extruder, the method comprising extruding a tube of polymer resin along an axis of extrusion; cooling air from a temperature of greater than 55° F. down to a temperature between about 35° F. about 50° F. to produce an intermediate cooled air stream; dehumidifying the intermediate cooled air stream to less than about 15% humidity to produce a dehumidified intermediate cooled air stream; cooling the dehumidified intermediate cooled air stream to less than 35° F. to produce a super-cooled air stream; and directing the super-cooled air stream at the extruded tube of polymer resin.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
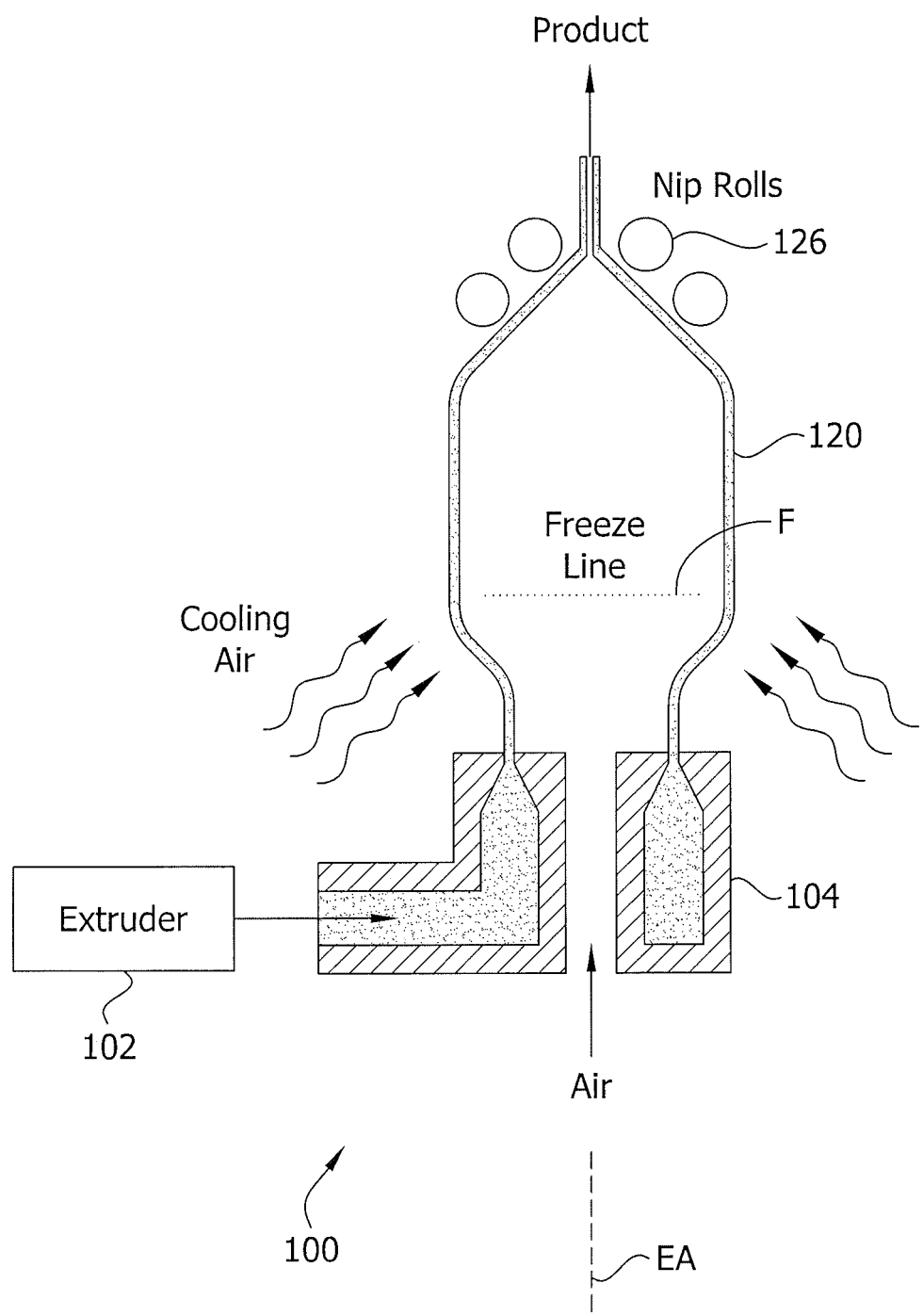
FIG. 1 is a schematic diagram of an extrusion system.
Figure 2:
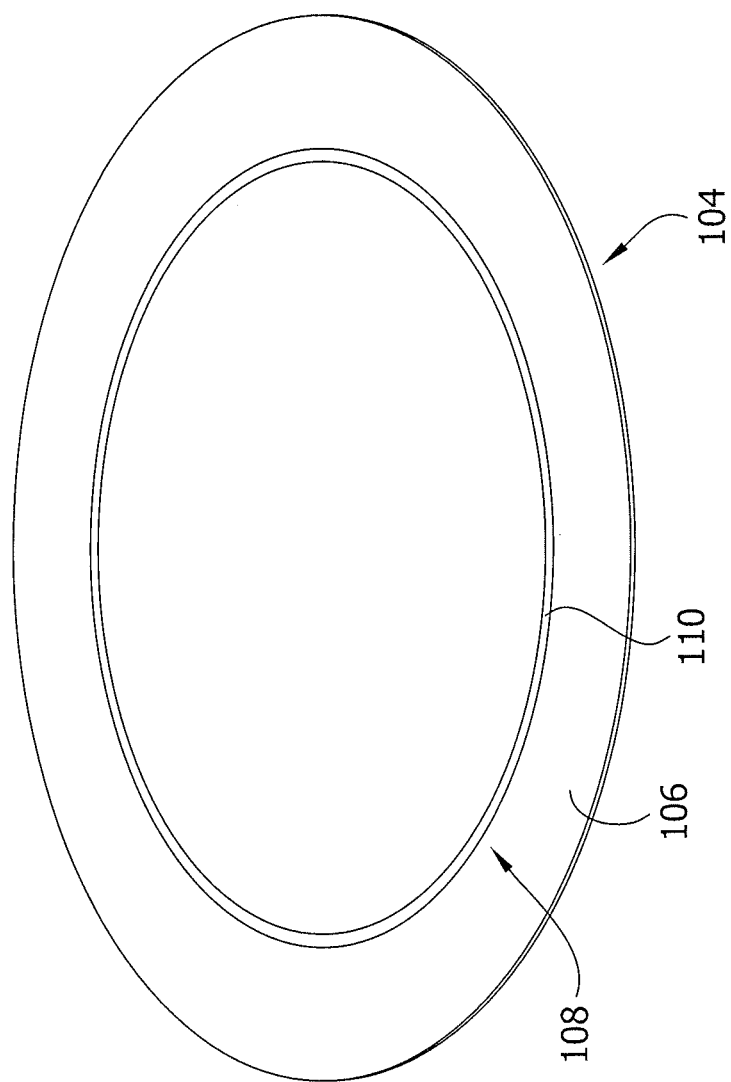
FIG. 2 is a perspective of an extrusion die for use with the extrusion system.

As a general proposition, the invention is performed using an extrusion system 100 as shown schematically in FIG. 1 which has an extruder 102 in which polymer is melted and pumped into a tubular die 104 through which it is extruded. In general the die 104 defines a die passage 108 (FIG. 2), which defines the cross-sectional shape of the film as it exits the die. As shown in FIG. 2, in some embodiments, the die 104 includes a die head 106, which defines the die passage 108. In general, a die 104 and die head 106 define a die passage 108 extending along an extrusion axis EA.

The extruder 102 pumps molten plastic materials through the die 104 to form an extruded tube or bubble 120 (FIG. 1) of plastic film. Air is blown along the extrusion axis EA in an extrusion direction as indicated by the arrows in FIG. 1 through the middle of the extruded tube. Typically, the tube 120 is expanded in both the lengthwise and radial direction up until a so-called "frost line" or "freeze line" F at which point the plastic film solidifies such that it no longer expands. But in other embodiments, the tube 120 does not expand radially after exiting the extrusion die 104. For example, in some embodiments, the tube 120 narrows radially between the die 104 and frost line F. The height of the frost line F is measured as the distance from the die 104 to the frost line. The change in radial dimension of the film tube 120 between the outlet of the die 104 and the frost line F is measured as a blow up ratio (BUR). The BUR is the ratio of the diameter of the tube 120 at the frost line F to the diameter of the die passage 108, and it manifests the amount of stretching the polymer is undergoing during the shaping of the film. In particular, the BUR is calculated as follows: BUR=(0.637×Lay-Flat Width)/die diameter. In this calculation, the "lay-flat width" is the width of the film when collapsed into its flat bag conformation. If an extrusion system 100 has a BUR that is greater than one, the tube 120 expands radially as it extends from the die 104 to the frost line F. If the extrusion system 100 has a BUR that is less than one, the tube 120 shrinks radially as it extends from the die 104 to the frost line F. In certain conventional blown film applications, it is desirable to use an especially low diameter die relative to the width of the ultimate bag so that there is significant expansion and stretching in the lateral direction during blowing of the film.

There is a collector 126 above the frost line F for collecting the edges of the tube 120, which collector is here depicted as nip rolls. The tube 120 travels in the extrusion direction from the frost line F to the collector 126, which arranges the tubular film for subsequent processing. The illustrated collector 126 collapses the tube 120 such that the tube defines a bubble extending from the extrusion die head 106 at an upstream end of the bubble to the film collector 126 at a downstream of the bubble.

Figure 3:
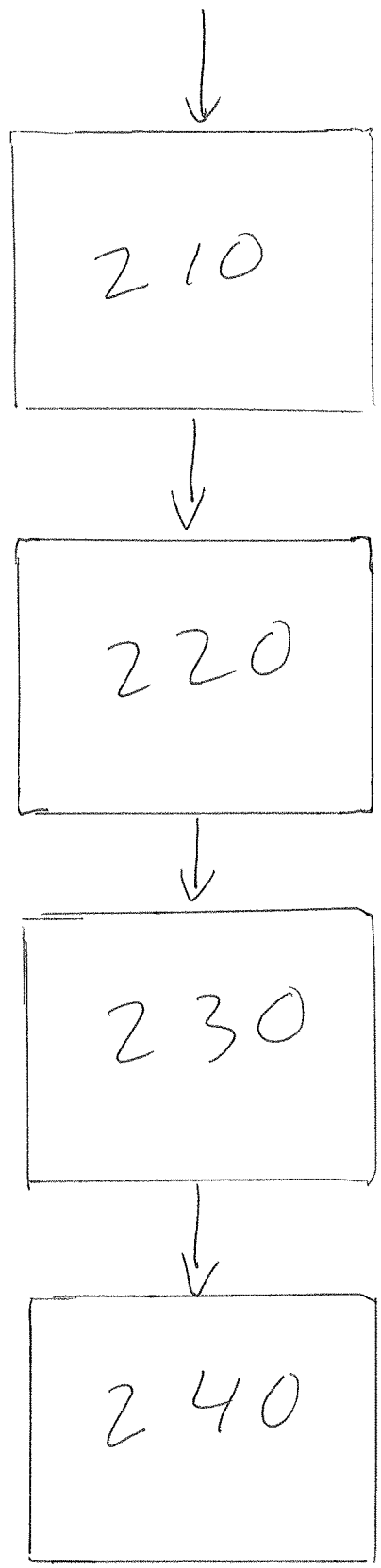
FIG. 3 is a schematic diagram of the process of the invention.

The cooling air directed at the extrusion as shown in FIG. 1 is super-cooled and dehumidified in accordance with this invention. In particular, in accordance with this invention, air used for cooling is prepared in a three-step process shown in FIG. 3 that involves a) 210 cooling to an intermediate temperature, b) 220 dehumidifying the air, and c) 230 further cooling the air to a service temperature of between 15° F. and 40° F., such as less than 35° F., or less than 30° F. After step c) 230, the air is directed to the extrusion operation 240. In one preferred embodiment the service temperature to which the air is cooled is less than 25° F., such as between about 15° F. and about 25° F. The air cooling equipment includes an air intake unit for drawing air into the system, a heat exchanger for the first cooling step (a) at 210, a dehumidifier for dehumidifying step (b) at 220, and a heat exchanger for the second cooling step (c) at 230. There are also two chiller units, one for each of the heat exchangers.

In one embodiment, the process in step (a) involves cooling air from a temperature of greater than 55° F., such as between about 55° F. and about 100° F., down to a temperature between about 35° F. about 50° F., such as about 40° F. This is preferably accomplished using a heat exchanger to pass the incoming air through coils containing a refrigerant, for this step chill water.

The subsequent dehumidification operation of step (b) is preferably accomplished using a dessicant wheel dehumidifier. In this operation, the air is dehumidified to less than about 15% humidity, preferably less than 10% or 5% humidity, most preferably to about 0% humidity.

In the final cooling air preparation step (c), the air is further cooled from between about 35° F. about 50° F. down to the desired service temperature of less than 35° F., or less than 30° F., or less than 25° F., such as between about 15° F. and about 25° F. using a glycol-containing refrigerant.

It is critical according to this invention to employ these three distinct operations. If the humidity is not removed in an intermediate dehumidifying step as described, moisture in the air is detrimental to production in that it can freeze within the air conduit system or on the extrusion equipment, or it can condense on the film. And it is not sufficient to simply cool the air all the way from greater than about 55° F. all the way down to less than about 35° F. and then dehumidify at that low service temperature because it would not be energy efficient.

The super-cooled air is caused to flow through an air ring outside the blown film, or otherwise directed at the film exterior, or internally, through the internal bubble cooling system, or both. In some embodiments, the extruded tube of polymer resin includes at least one continuous thickened profile section and at least one continuous thin section extending along an axis of extrusion. This applies, for example, when the product being extruded is a bag film and the thickened section corresponds to a zipper profile, and the thin section corresponds to a thin, major panel of the bag.

The material used to manufacture the films of the invention is, in one or more preferred embodiments, conventional polyethylene-based material selected from among low density polyethylene (LDPE), linear low density polyethylene (LLDPE), metallocene linear low density polyethylene (m-LLDPE), high density polyethylene (HDPE) and blends thereof. For example, one embodiment uses a blend of about 70-75 wt % LDPE, about 15-25 wt % LLDPE, and about 5-10 wt % m-LLDPE. The compositions of the layers are described herein as containing various components by weight %. However, those skilled in the art understand that in a layer of the ultimate film, the specific compounds may not be separately identifiable or even necessarily separately present. Nonetheless, it is conventional in the art to refer to the final composition as containing a given % of the individual components that go into forming the film; so that is done here. From this perspective, the compositions herein are on an equivalent basis.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above products and methods without departing from the scope of the invention, it is intended that all matter contained in the above description shall be interpreted as illustrative and not in a limiting sense.

What is claimed is:

1. A method for manufacturing a blown plastic film using an extruder, the method comprising:
    extruding a tube of polymer resin;
    cooling air from a temperature of greater than 55° F. down to a temperature between about 35° F. and about 50° F., to produce an intermediate cooled air stream;
    dehumidifying the intermediate cooled air stream to less than about 15% humidity, to produce a dehumidified intermediate cooled air stream;
    cooling the dehumidified intermediate cooled air stream to less than 35° F., to produce a super-cooled air stream; and
    directing the super-cooled air stream at the extruded tube of polymer resin.

2. The method of claim 1 wherein the dehumidified intermediate cooled air stream has a humidity of less than 10%.

3. The method of claim 1 wherein the dehumidified intermediate cooled air stream has a humidity of less than 5%.

4. The method of claim 1 wherein the dehumidified intermediate cooled air stream has a humidity of about 0%.

5. The method of claim 1 wherein the super-cooled air stream has a temperature of less than 30° F.

6. The method of claim 1 wherein the super-cooled air stream has a temperature of less than 25° F.

7. The method of claim 1 wherein the super-cooled air stream has a temperature of between about 15° F. and 25° F.

8. The method of claim 1 wherein the dehumidified intermediate cooled air stream has a humidity of less than 5% and the super-cooled air stream has a temperature of less than 30° F.

9. The method of claim 1 wherein the dehumidified intermediate cooled air stream has a humidity of less than 10% and the super-cooled air stream has a temperature of between about 15° F. and 25° F.

10. The method of claim 1 wherein the extruded tube of polymer resin includes at least one continuous thickened profile section and at least one continuous thin section extending along an axis of extrusion.

11. The method of claim 3 wherein the extruded tube of polymer resin includes at least one continuous thickened profile section and at least one continuous thin section extending along an axis of extrusion.

12. The method of claim 7 wherein the extruded tube of polymer resin includes at least one continuous thickened profile section and at least one continuous thin section extending along an axis of extrusion.

13. The method of claim 8 wherein the extruded tube of polymer resin includes at least one continuous thickened profile section and at least one continuous thin section extending along an axis of extrusion.

14. The method of claim 9 wherein the extruded tube of polymer resin includes at least one continuous thickened profile section and at least one continuous thin section extending along an axis of extrusion.

* * * * *